US009252632B2

(12) United States Patent
Lewis

(10) Patent No.: US 9,252,632 B2
(45) Date of Patent: Feb. 2, 2016

(54) EMERGENCY LIGHTING SYSTEM

(71) Applicant: Raymond J. Lewis, Weaverville, NC (US)

(72) Inventor: Raymond J. Lewis, Weaverville, NC (US)

(*) Notice: Subject to any disclaimer, the term of this patent is extended or adjusted under 35 U.S.C. 154(b) by 0 days.

(21) Appl. No.: 14/314,101

(22) Filed: Jun. 25, 2014

(65) Prior Publication Data

US 2015/0380984 A1    Dec. 31, 2015

(51) Int. Cl.
| H05B 37/00 | (2006.01) |
| H02J 9/06 | (2006.01) |
| H05B 37/02 | (2006.01) |
| H05B 33/08 | (2006.01) |

(52) U.S. Cl.
CPC .............. *H02J 9/06* (2013.01); *H05B 33/0845* (2013.01); *H05B 37/0218* (2013.01)

(58) Field of Classification Search
USPC ......... 315/86, 291, 307, 308; 362/20; 307/64, 307/65, 66
See application file for complete search history.

(56) References Cited

U.S. PATENT DOCUMENTS

| 6,010,228 | A | * | 1/2000 | Blackman et al. | ............... 362/95 |
| 6,752,515 | B2 | | 6/2004 | Evans et al. | |
| 6,805,469 | B1 | * | 10/2004 | Barton | .......................... 362/365 |
| 7,118,235 | B2 | * | 10/2006 | Barton | ............................ 362/20 |
| 7,218,156 | B2 | | 5/2007 | Harwood | |
| D643,765 | S | | 8/2011 | Huang et al. | |
| 7,990,252 | B2 | * | 8/2011 | Barton | .......................... 340/333 |
| 8,049,364 | B2 | | 11/2011 | Shakespeare et al. | |
| 8,083,376 | B2 | | 12/2011 | Chien | |
| 8,333,481 | B2 | | 12/2012 | Deng | |
| 8,333,491 | B1 | | 12/2012 | Chou et al. | |
| 8,629,617 | B2 | * | 1/2014 | Richards et al. | ................. 315/51 |

* cited by examiner

*Primary Examiner* — Thuy Vinh Tran

(57) ABSTRACT

An emergency lighting system is configured to activate a plurality of emergency lights in response to a determination of an emergency condition, wherein the determination of the emergency condition includes determining if the system is not receiving power from a power source and/or determining if an amount of ambient light proximate the system is below a predetermined threshold. Moreover, the emergency lighting system is configured to reduce an amount of power provided from a battery to the one or more emergency lights when an emergency condition is determined in order to maximize a battery life of the system.

20 Claims, 4 Drawing Sheets

EMERGENCY LIGHTING SYSTEM

FIELD

The present disclosure generally relates to an emergency lighting system configured to maximize a battery life of the system.

BACKGROUND

Light sources are widely used in residential, commercial, and military structures to provide an amount of light for persons to perform a wide variety of daily tasks without the necessity of natural light sources. Such structures generally receive electrical power through established electrical grids to provide a requisite amount of electricity to operate such light sources. Due to certain events, such as storms, hurricanes, wars, or other natural or man-initiated disasters, receipt of electrical power from such outside sources may be disrupted for extended periods of time. For example, in response to certain natural phenomenon, electrical grids may be down for weeks or even months.

Emergency lighting systems are known to be mounted in structures to provide lighting when electrical power to the structures has been disrupted. These lighting systems are generally optimized to provide a maximum amount of brightness to assist in, for example, emergency ingress and egress from such structures. However, certain problems may exist with this configuration. For example, as these emergency lighting systems are known to be optimized to provide a maximum amount of brightness, the battery life of such systems may be limited. More particularly, in certain situations, users may continue to occupy the structure awaiting power restoration or evacuation. In such a case, the existing emergency lighting systems may not last long enough to provide light until electrical power may be restored to the structure, or in the event of a wide scale natural disaster, until rescue teams may provide for evacuation of the structure. Additionally, as the known emergency lighting system are configured to be mounted to, e.g., a wall or a ceiling, they may not be widely available in residential or other situations where ease of installation and aesthetics are of greater concern.

Accordingly, an emergency lighting system optimized to extend battery life would be beneficial. Moreover, an emergency lighting system that may easily be installed and may blend with a décor of a room would be particularly useful.

BRIEF DESCRIPTION OF THE DISCLOSURE

Aspects and advantages of the invention are set forth below in the following description, or may be obvious from the description, or may be learned through practice of the invention.

In one embodiment of the present disclosure, an emergency lighting system is provided, the emergency lighting system including a housing, one or more emergency lights configured to direct light outwardly from the housing when activated, and a battery positioned in the housing. The emergency lighting system additionally includes a control board positioned at least partially in the housing and in electrical communication with the one or more emergency lights and the battery. The control board is configured to determine an emergency condition, and in response to the determination of an emergency condition, receive electrical power at a first voltage from the battery, reduce the power received from the battery to a second voltage, and provide the power reduced to the second voltage to the one or more emergency lights to activate the one or more emergency lights. Additionally, the control board is configured to determine an emergency condition based at least in part on a determination that electrical power is not being received by the control board from a power source.

In one exemplary aspect of the present disclosure, a method of providing emergency lighting using an emergency lighting system is provided, the method including determining the emergency lighting system is not receiving electrical power from a power source. The method additionally includes determining an emergency condition at least in part in response to the determination that the emergency lighting system is not receiving electrical power from the power source. The method further includes providing a control board electrical power at a first voltage from a battery in response to the determination of the emergency condition and reducing the electrical power received from the battery to a second voltage. Moreover, the method includes providing the electrical power reduced to the second voltage to one or more emergency lights to activate the one or more emergency lights.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION

Figure 1:
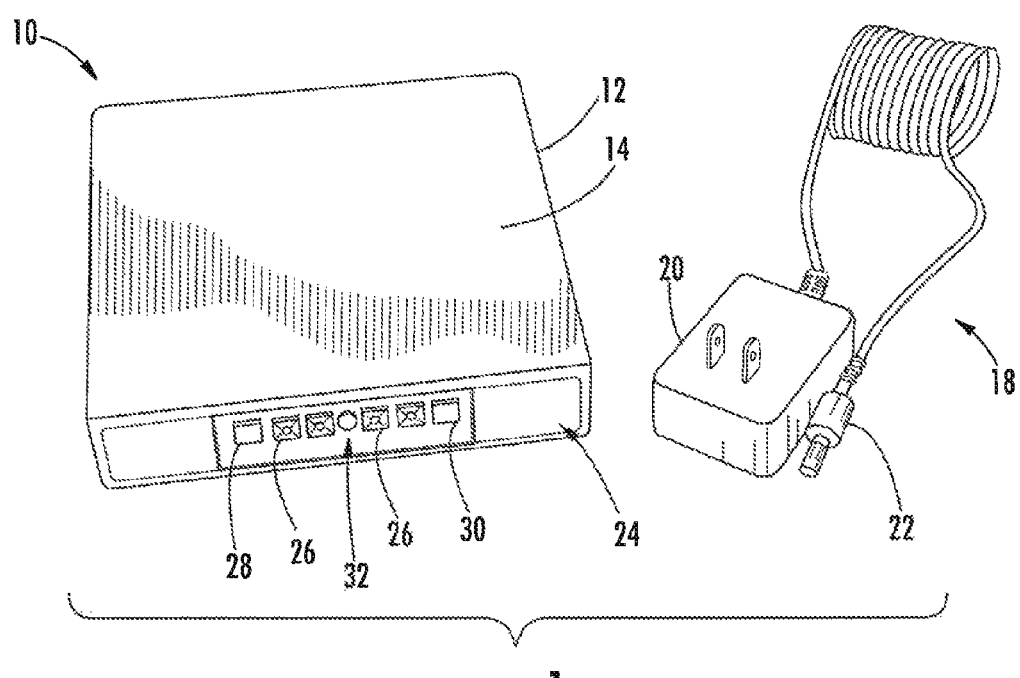
FIG. 1 is a perspective view of one embodiment of an emergency lighting system in accordance with the present invention.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present invention without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure is generally related to an emergency lighting system configured to maximize a battery life of the system. For example, the emergency lighting system may be configured to activate one or more emergency lights in response to a determination of an emergency condition, wherein the determination of an emergency condition includes determining the system is not receiving power from a power source and/or determining an amount of ambient light proximate the system is below a predetermined threshold. Moreover, the emergency lighting system may be configured to reduce an amount of power provided from a battery to the one or more emergency lights when an emergency condition is determined in order to maximize a battery life of the system.

Figure 2:
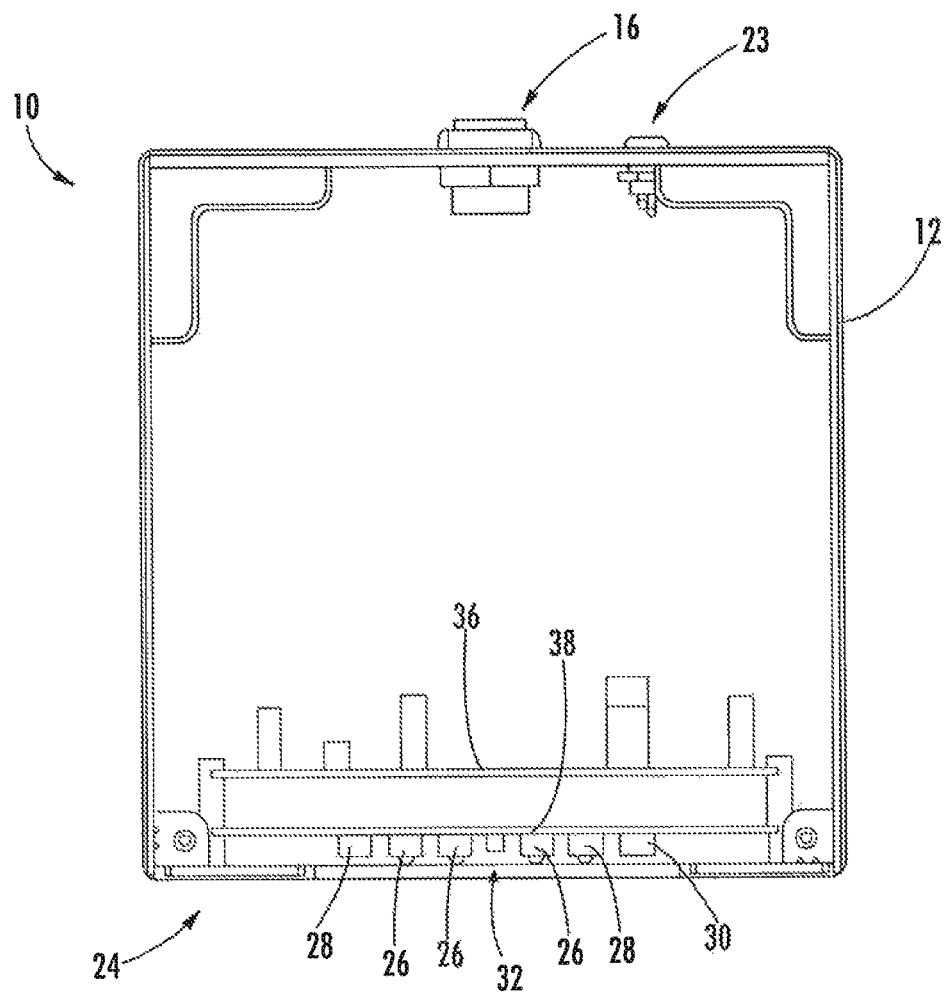
FIG. 2 is top view of the exemplary emergency lighting system of FIG. 1, with a top portion removed.
Figure 3:
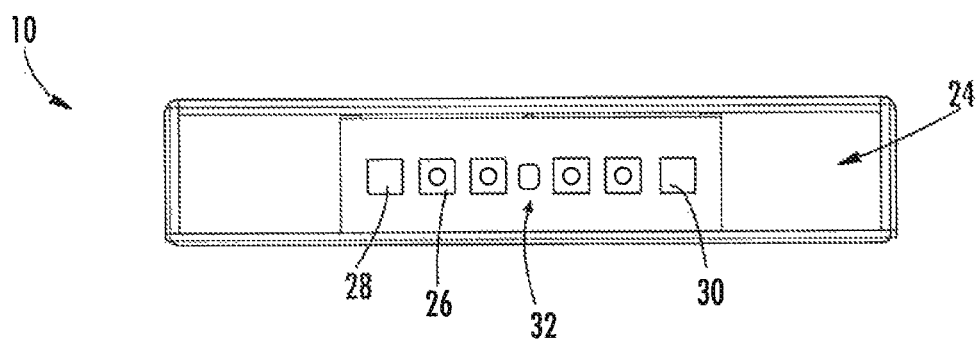
FIG. 3 is a rear view of the exemplary emergency lighting system of FIG. 1.

Referring now to the drawings, wherein identical numerals indicate the same elements throughout the figures, FIGS. 1 through 3 depict an emergency lighting system 10 in accordance with an exemplary embodiment of the present disclosure. More particularly, FIG. 1 provides a perspective view of the system 10, FIG. 2 provides a top view of the system 10, and FIG. 3 provides a front view of the system 10. As is depicted, the system 10 generally includes a housing 12 and a power cord 18. The power cord 18 is configured to electrically connect with a power source (not shown), such as a conventional wall outlet or an extension cord, through a receiving end 20. The power source may provide alternating current ("AC") electrical power at, for example, 120 volts and 60 hertz ("hz"), it being understood, however, that in other exemplary embodiments, the power source may instead provide electrical power at various other voltages and frequencies. For example, in certain exemplary embodiments, the power source may provide AC electrical power at 230 volts and 50 hz. It should be appreciated, however, that in still other exemplary embodiments, the power source may instead provide Direct Current ("DC") power to the system 10.

The power cord 18 further includes a connector 22 configured to be received within a connector slot 23 positioned at a rear end of the housing 12 (FIG. 2), placing the system 10 in electrical communication with the power source. Although operation of the system 10 will be described with reference to the Figs. below, as is depicted, the system 10 additionally includes an "On/Off" switch 16 positioned at the rear end of the housing 12 for switching the system 10 between an operating mode (i.e., "On") and a non-operating mode (i.e., "Off").

Referring still to FIGS. 1-3, the system 10 additionally includes a control board positioned at least partially within the housing 12 and in electrical communication with the power source, with one or more emergency lights 26, and with a battery (see FIG. 2). More particularly, the exemplary system 10 of FIGS. 1-3 includes a first control board 38 and a second control board 36, each of which may be a printed control board ("PCB"). The first control board 38 includes attached thereto and in electrical communication therewith one or more emergency lights 26, a system power indicator 28, and a charging indicator 30. Although not depicted, the control boards 36, 38 may be in electrical communication with the various other components and switches directly by having such components mounted to one or both of the control boards 36, 38, or alternatively through one or more electrical lines.

One or more of the emergency lights 26 and/or indicators 28, 30 may be light emitting diodes ("LEDs"). Alternatively, however, in other exemplary embodiments, one or more of the emergency lights 26 and/or indicators 28, 30 may be any other electrical light source, such as a fluorescent or an incandescent bulb. Moreover, although the present embodiment is depicted with four (4) emergency lights 26, each configured to direct light substantially in the same direction outwardly from the housing 12, in other exemplary embodiments, any suitable number of emergency lights may be provided, configured to direct light in any suitable direction(s). Moreover, in other exemplary embodiments, the system 10 may not include indicator lights 28, 30, or alternatively may include one or both of the indicator lights 28, 30 in any other suitable location on or in the housing 12.

The housing 12 may be comprised of any suitable material, such as a suitable plastic or metal material. Additionally, the system 10 may include one or more removable parts to allow a user access to internal components of the system 10. For example, the housing 12 may include a removable top portion 14, as in the embodiment of FIGS. 1-3. Once the top portion 14 is removed (see FIG. 2), the internal components of the system 10 may be exposed. Such a configuration may allow a user to, for example, exchange or replace one or more control boards 36, 38 without replacing the system 10. More particularly, as the embodiment of FIGS. 1-3 includes the lights 26 and indicators 28, 30 positioned on a control board 38 separate from the other components on control board 36, a user may remove the control board 38 and either replace one or more of the lights 26 and indicators 28, 30 as needed, or alternatively may replace the control board 36 altogether. Similarly, a user may remove only the control board 36 and replace, e.g., a battery or other component, or alternatively may replace the control board 36 altogether. Such a modular configuration may allow for a more versatile and customizable emergency lighting system 10.

It should be appreciated, however, that in other exemplary embodiments, the housing 12 of the system 10 may not include any removable portions, and may instead be made integrally.

Moreover, the system 10 of FIGS. 1-3 may be a stand-alone system capable of being installed, positioned, or moved by a user with relative ease. For example, the system 10 need not be permanently mounted to a wall or ceiling and hard-wired into a structure's electrical system. Instead, the system 10 of FIGS. 1-3 may be simply placed on a shelf, side table, desk, or mantle and plugged in to an existing wall outlet. Accordingly, the exemplary system 10 of FIGS. 1-3 may include a housing 12 with an outer surface free from, for example, mounting tabs, mounting slots or holes, or other attendant hardware. Such a configuration may provide for an emergency lighting system 10 a user is more inclined to utilize as minimal installation is required with such a system. Further, the system 10 may be sized such that it may be positioned where desired and, with the help of the housing 12 design, easily blend in with a décor of a room, hallway, staircase, etc. For example, the housing 12 of the system 10 may be less than about two (2) inches tall, such as less than about one and a half (1.5) inches tall, such as approximately one and a quarter (1.25) inches tall. Additionally, the housing 12 of the system 10 may be less than about twelve (12) inches wide, such as less than about eight (8) inches wide, such as approximately six and a half (6.5) inches wide. Similarly, the housing 12 of the system 10 may be less than about twelve (12) inches deep, such as less than about eight (8) inches deep, such as approximately six and a half (6.5) inches deep.

Figure 4:
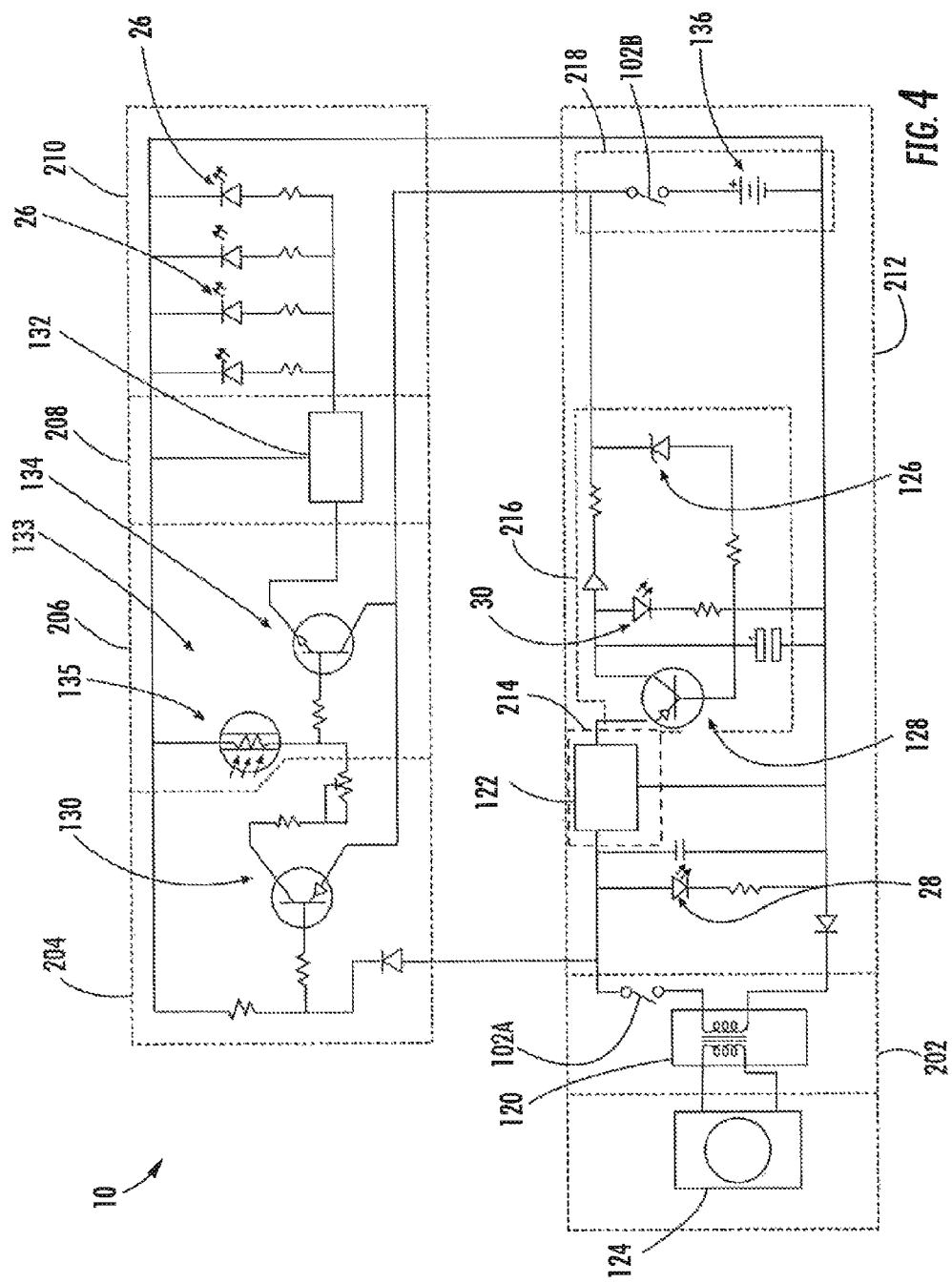
FIG. 4 is a schematic representation of an exemplary embodiment of an emergency lighting system in accordance with the present invention.

Referring now to FIG. 4, operation of the emergency lighting system 10 will be explained with reference to an exemplary schematic representation of one embodiment of an emergency lighting system 10. The exemplary schematic representation is delineated into functional block components by functional blocks drawn in phantom. The system 10 will first be described generally with reference to the functional blocks depicted, and then the specific exemplary embodiment of the system 10 schematically represented will be described.

With reference to the function components, the system 10 generally includes a first power conversion module 202 configured to receive electrical power from an AC power source, such as a wall outlet or extension cord, and convert the electrical power to DC power. For the embodiment depicted, the power source may provide power at 120 volts and 60 hz, and the first power conversion module may convert the power to approximately 12 volts DC. It should be appreciated, however, that in other exemplary embodiments, the power source may provide any suitable electrical power, and the first power conversion module 202 may convert it to any suitable level of DC power sufficient to run the requisite circuitry of the system 10.

The exemplary system 10 additionally includes a power reserve module 212 in electrical communication with the first power conversion module 202. The power reserve module 212 is configured to receive power from the first power conversion module 202 and store at least a portion of such power for emergency conditions. The power reserve module 212 generally includes a second power conversion module 214, a charging circuit module 216, and a battery module 218.

The second power conversion module 214 is configured to reduce a power received from the first power conversion module 202. For example, the second power conversion module 214 may reduce power received at approximately 12 volts DC to approximately 9 volts DC. This is done to optimize the power reserve module 216 for the specific battery module 218 included and to allow for effective operation of a power supply check module 204, discussed below. It should be appreciated, however, that in other exemplary embodiments, the second power conversion module 214 may instead reduce the electrical power received to any other suitable voltage.

As stated, the power reserve module 212 additionally includes a charging circuit module 216 configured to determine if a power level (e.g., voltage level) of the battery module 218 is below a certain threshold. If the power level of the battery module 218 is below a certain threshold, the charging circuit 216 is configured to direct power to the battery module 218 and charge the battery module 218. The battery module 218 may include one or more rechargeable batteries to store power when the system 10 is receiving power and provide power to the system 10 when an emergency condition is determined, as discussed below.

With continued reference to the functional components depicted in FIG. 4, the exemplary system 10 additionally includes a power supply check module 204. The power supply check module 204 is in electrical communication with the power reserve module 212 and the first power conversion module 202. The power supply check module 204 is configured to determine whether or not the system 10 is receiving electrical power from the power source. Additionally, the exemplary system 10 of FIG. 4 includes an ambient light check module 206 in electrical communication with the power supply check module 204 and the power reserve module 212. The ambient light check module 206 is configured to determine whether or not an amount of ambient light proximate the housing 12 of the system 10 is above a predetermined threshold. The power supply check module 204 and the ambient light check module 206 are together configured to determine an emergency condition. More particularly, for the exemplary system 10 of FIG. 4, an emergency condition is determined when electrical power is not being received from the power source (indicating, for example, a power outage), and when ambient light proximate the housing 12 (see FIG. 1) is below a predetermined threshold. The predetermined threshold may be a minimum amount of ambient light necessary for emergency activities, such as ingress and egress from a structure, room, hallway, etc. However, in other exemplary embodiments, the emergency condition may alternatively be determined by the power supply check module 204 or the ambient light check module 206 individually. Further, in other exemplary embodiments, the ambient light check module 206 may instead be positioned upstream from the power supply check module 204 to determine the emergency condition.

The power supply check module 204 and the ambient light check module 206 are configured to receive power from the power reserve module 212, or more particularly from the battery module 218, and when an emergency condition is determined, the modules 204 and 206 are configured to direct or transfer such electrical power to a third power conversion module 208.

The third power conversion module 208 is provided in electrical communication with the power supply check module 204 and the ambient light check module 206, and with an emergency lights module 210. As stated, electrical power from the power reserve module 212 is provided to the third power conversion module 208 when an emergency condition is determined. For the embodiment depicted, electrical power is provided from the power reserve module 212 at approximately nine (9) volts and reduced by the third power conversion module 208 to approximately five (5) volts.

Power reduced by the third power conversion module 208 is then provided to an emergency lights module 210. The emergency lights module 210 is activated when the reduced power is received from the third power conversion module 208, providing an amount of light to an area surrounding the system 10 through a plurality of emergency lights 26 (see FIGS. 1-3). Accordingly, for the embodiment depicted, the system 10 is configured to provide the emergency lights module 210 with an amount of power less than a maximum level of power of the battery module 218 throughout the emergency condition. Such functionality may maximize a battery life of the system 10 to allow for longer operation of the emergency lights module 210 during emergency conditions. More particularly, such a configuration may reduce the rate of power consumption, while still providing a useful amount of light output from the emergency lights module 210.

It should be appreciated, however, that in other exemplary embodiments the power conversion module 208 may instead reduce the power provided to the emergency lights module 210 to any other suitable voltage, provided such voltage is less than the voltage at which the batteries are configured for. For example, in other exemplary embodiments, the power conversion module 208 may reduce the electrical power to approximately 8 volts, approximately 6 volts, approximately 4 volts, or approximately 2 volts. Additionally, in other exemplary embodiments, the module 208 may vary an amount of reduction provided.

It should also be appreciated that while in certain exemplary embodiments, the electrical components schematically represented within a functional block, as will be discussed below, may be included to provide such functionality to the system, in other exemplary embodiments, any other suitable configuration of electrical components may be utilized to provide the above described functionality for the system 10.

With reference still to the embodiment of FIG. 4, the specific exemplary embodiment of the system 10 schematically represented in FIG. 4 will now be discussed.

The system 10 is in electrical communication with a power source through a plug 120. The power source for the embodiment depicted is a wall outlet 124, which may provide AC electrical power at approximately 120 volts and 60 hz. The plug 120 may be configured as the plug 18 depicted in FIG. 1 and may convert the electrical power from the outlet 124 to approximately 12 volts DC power. It should be understood, however, that in other embodiments, the system may be operated at different power levels.

A switch is also provided to place the system in an "On" position or an "Off" position. When in the "Off" position, the switch disconnects the power source from the system 10 without activating the emergency lights 26, as discussed below. The switch consists of a first switch 102A configured to disconnect the power source from the system 10 and a second switch 102B configured to disconnect a battery 136 from the emergency lights 26. The switches 102A and 102B may be activated by actuation of the switch 16 depicted in FIG. 2.

A portion of the electrical power transformed by the plug 120 to approximately 12 volts DC flows through an indicator 28 in electrical communication with the plug 120, downstream from the switch 102A. The indicator 28 may be a green-colored LED light configured to indicate to a user that the system 10 is in the "On" position. It should be appreciated, however, that in other embodiments, any other color may be provided for indicator 28, or alternatively indicator 28 may not be included at all.

A portion of the electrical power transformed by the plug 120 additionally flows to a power reserve portion consisting essentially of a power regulator 122, a charging circuit 128, and the battery 136. For the embodiment depicted, the power regulator 122 is configured to convert the electrical power from approximately 12 volts DC to approximately 9 volts DC. This is to allow the charging circuit to be optimized for charging the battery 136 and to provide a requisite voltage difference for the system power sensor 130, discussed below. As discussed below, the exemplary battery 136 is a nine (9) volt battery. It should be appreciated, however, that in other exemplary embodiments, the battery 136 may have any other suitable voltage, and accordingly the regulator 122 may reduce the power to any such voltage.

The reduced electrical power flows downstream from the regulator 122 to the charging circuit 128, which for the embodiment depicted includes a bipolar junction transistor ("BJT"), such as a "PNP transistor." A voltage sensor 126 is also provided, configured to receive a power from the battery 136. As one having skill in the art will appreciate, the charging circuit 128 provides an electrical connection between the regulator 122 and the battery 136 when the battery power is below a predetermined threshold. The predetermined threshold is set using the voltage sensor 126 and is configured to correspond to a voltage of the battery 136.

For the embodiment depicted, the voltage sensor 126 is a zener diode, with a peak inverse voltage of approximately 8.5 volts. Accordingly, for the embodiment depicted, the system 10 is configured to charge the battery 136 when the charge of the battery is below about 8.5 volts. In other embodiments, however, the voltage sensor 126 may have any other suitable peak inverse voltage corresponding to the battery 136.

As is also depicted, an indicator 30 is provided in electrical communication with the charging circuit 128 to indicate to a user when the system 10 is charging. The indicator 30 may, for example, be a red-colored LED configured to indicate to the user the system 10 is charging (see FIGS. 1-3). It should be appreciated, however, that in other embodiments, any other color may be provided for indicator 30, or alternatively indicator 30 may not be included at all.

The battery 136 may be a plurality of nine (9) volt rechargeable Lithium Iron Phosphate batteries. For example, the battery 136 may be a pack of twelve (12) rechargeable batteries. It should be appreciated, however, that in other exemplary embodiments, the battery 136 may instead be any other suitable type of battery, such any other suitable lithium chemistry battery, and may include any suitable number of batteries. For example, in other exemplary embodiment, the battery 136 may include a group of two or more, four or more, eight or more, or ten or more batteries. Alternatively, however, in still other exemplary embodiments, the battery 136 may be a single battery. Further, in still other exemplary embodiments, the battery 16 may not be a rechargeable battery. In such an exemplary embodiment, the system 10 may not include, e.g., the power regulator 122 or the charging circuit 128. Moreover, the battery 136 may in other embodiments have any other power level. For example, the battery may instead be a ten (10) volt battery, an eight (8) volt battery, or a six (6) volt battery.

Referring still to the exemplary embodiment of FIG. 4, a portion of the power from the plug 120 is also directed to a system power sensor 130. The system power sensor 130 is configured to determine whether or not the system 10 is receiving power from the power source. As is depicted, the sensor 130 is in electrical communication with the plug 120 and the battery 136. For the embodiment depicted, the system power sensor 130 is a BJT, such as a PNP transistor. Accordingly, when the system 10 is receiving power from the power source (converted to, e.g., 12 volts DC), the sensor 130 blocks a flow of power from the battery 136 (at, e.g., 9 volts DC) to a light sensor 133. However, when the system 10 is no longer receiving power from the power source, the sensor 130 allows electrical power from the battery 136 to flow to the light sensor 133.

The light sensor 133 is comprised of a resistor 135 and a BJT 134, and is positioned downstream of the system power sensor 130. Electrical power flowing through the system power sensor 130 may either travel to the BJT 134, or alternatively, may travel through the resistor 135. For the embodiment depicted, the BJT 134 may be an "NPN Transistor." Additionally, the resistor 135 is configured as a photoresistor and may be positioned to receive ambient light from outside the housing 12 of the system 10 (see light sensor 32 in FIGS. 1-3). The resistor 135 has a variable resistance that decreases as it is exposed more light. Accordingly, when the resistor 135 is exposed to an amount of ambient light above a predetermined threshold, its resistance drops and essentially "shortsout" the BJT 134. By contrast, however, when the resistor 135 receives less than a predetermined amount of light, the resistance increases and forces the electrical power from the system power sensor 130 to the BJT 134, such power enabling electrical power from the battery 136 to flow therethrough to a voltage regulator 132.

A system having a system power sensor 130 and a light sensor 133 of such a configuration can ensure that electrical power from the battery 136 is only supplied to the emergency lights 26 during an emergency condition, which for the embodiment of FIG. 4 comprises a power outage condition and when the amount of ambient light is below the predetermined threshold. As noted above, the predetermined threshold of ambient light for the resistor 135 may be an amount necessary for performing certain emergency processes, such as ingress and egress of an area. Notably, with such a configuration, power from the battery 136 may essentially bypass flowing through the system power sensor 130 and most of the light sensor 133 during an emergency condition, which may prevent waste of the system's 10 power and assist in maximizing the system's 10 battery life during an emergency condition.

Referring still to FIG. 4, the system 10 additionally includes the voltage regulator 132 configured to receive electrical power from battery 136, reduce such electrical power from a first voltage, which may be approximately nine (9) volts DC, to a second voltage, which may be approximately five (5) volts DC, and then provide electrical power at the second voltage to the one or more emergency lights 26. The voltage regulator 132 may reduce the electrical power independently of any system parameters, such as, for example, a power level of the battery. Accordingly, the system 10 may provide the emergency lights 26 with an amount of electrical power equal to or less than the second voltage throughout an emergency condition. Therefore, the system 10 described herein may allow for an extended operation of the system 10 over a system that, for example, waits until the battery life is drained to a predetermined amount prior to reducing an amount of power provided to the emergency lights 26.

More particularly, by including the voltage regulator 132 configured to reduce electrical power from the battery 136 prior to reaching the emergency lights 26, the exemplary system 10 of FIG. 4 may reduce a rate of power consumption by the emergency lights 26 during an emergency condition. For example, the system 10 may reduce the rate of power consumption by approximately 10% or more, by approximately 20% or more, by approximately 30% or more, or by approximately 40% or more. However, as stated, such a configuration may still provide a useful amount of light output by the emergency lights 26 during an emergency condition. For example, such a configuration may still provide up to 90% of the emergency light's rated capacity. Alternatively, the system 10 may be configured to provide up to 80% of the emergency light's rated capacity, up to 70% of the emergency light's rated capacity, or up to 60% of the emergency light's rated capacity.

In certain exemplary embodiments, one or more of the components described with reference to FIG. 4 may be electrically connected to a control board, such that the control board, for example, receives power from the power source and the battery 136 and is configured to perform various functions described above. For example, each of the various components schematically represented in FIG. 4 may be arranged in any suitable manner on the one or more control boards, such as printed control boards. Alternatively, however, any other suitable control board or other means for electrically connecting the various components of the system 10 may be used.

The plurality of emergency lights 26, described above, with reference to FIGS. 1-4, may provide emergency lighting to an area proximate to the system 10. Additionally, by reducing the electrical power from the battery 136 from the first voltage to the second voltage, the battery life of the system 10 may be optimized, such that the system 10 may provide emergency lighting for an extended amount of time prior to the battery 136 running out of electrical power. For example, certain embodiments of the present disclosure may be capable of providing emergency lighting for approximately two (2) months or more.

Figure 5:
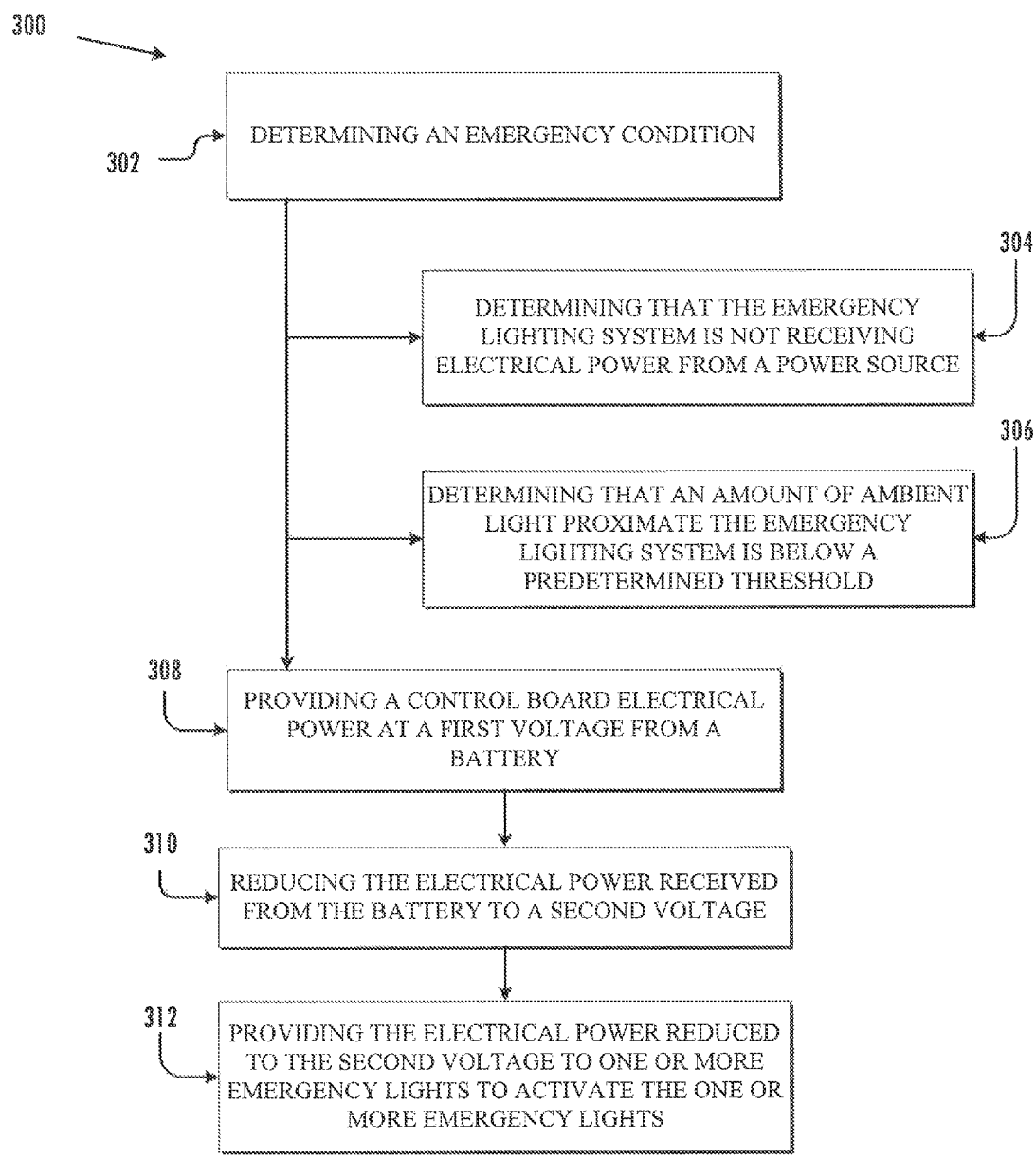
FIG. 5 is a flow diagram of an exemplary method of providing emergency lighting in accordance with the present invention.

With reference now to FIG. 5, an exemplary method (300) for providing emergency lighting using an emergency lighting system is depicted. The method (300) includes at (302) determining an emergency condition. For the exemplary method (300) of FIG. 5, determining the emergency condition at (302) is based at least in part on a determination at (304) that the emergency lighting system is not receiving electrical power from a power source and a determination at (306) that an amount of ambient light proximate the emergency lighting system is below a predetermined threshold. In response to determining an emergency condition at (302), the method (300) includes at (308) providing a control board electrical power at a first voltage from a battery. Additionally, the method (300) includes at (310) reducing the electrical power received from the battery to a second voltage, and at (312) providing the electrical power reduced to the second voltage to one or more emergency lights to activate the one or more emergency lights. The method (300) may reduce the electrical power received from the battery to the second voltage independent of any operating parameters of the emergency lighting system, such as remaining battery power. Accordingly, the method (300) may include at (312) providing electrical power to the emergency lights at a voltage equal to or less than the second voltage throughout the entirety of the emergency condition. The exemplary method (300) depicted in FIG. 5 may therefore allow for an emergency lighting system having an optimized battery life such that it may provide emergency lighting for a prolonged duration of time.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed:

1. An emergency lighting system comprising:
  a housing;
  one or more emergency lights configured to direct light outwardly from the housing when activated;
  a battery positioned in the housing; and
  a control board positioned at least partially in the housing and in electrical communication with the one or more emergency lights and the battery, the control board configured to determine an emergency condition, and in response to the determination of the emergency condition, receive electrical power at a first voltage from the battery, reduce the power received from the battery to a second voltage, and provide the power reduced to the second voltage to the one or more emergency lights to activate the one or more emergency lights;
  wherein the control board is configured to determine the emergency condition based at least in part on a determination that electrical power is not received by the control board from a power source.

2. The emergency lighting system of claim 1, further comprising an ambient light sensor in electrical communication with the control board for determining an amount of ambient light proximate the housing, and wherein the control board is configured to determine the emergency condition based on a determination that an amount of ambient light sensed by the ambient light sensor is below a predetermined threshold and that electrical power is not received by the control board from the power source.

3. The emergency lighting system of claim 2, wherein control board comprises a pair of bipolar junction transistors positioned in series, the pair of bipolar junction transistors configured to determine when the amount of ambient light sensed by the ambient light sensor is below the predetermined threshold and when electrical power is not received by the control board from the power source.

4. The emergency lighting system of claim 1, wherein the control board is configured to provide electrical power to the emergency lights at a voltage equal to or less than the second voltage throughout the emergency condition.

5. The emergency lighting system of claim 1, wherein the control board comprises a pair of control boards.

6. The emergency lighting system of claim 1, wherein the one or more emergency lights are each Light Emitting Diodes.

7. The emergency lighting system of claim 1, wherein the battery is a Lithium Iron Phosphate battery.

8. The emergency lighting system of claim 1, wherein the battery is a group of six or more batteries.

9. The emergency lighting system of claim 1, wherein the power source is a wall outlet.

10. The emergency lighting system of claim 1, wherein the first voltage is approximately nine (9) volts and the second voltage is approximately five (5) volts.

11. The emergency lighting system of claim 1, wherein the control board is in electrical communication with the power source through a power cord, the power cord configured to convert electrical power from the power source from an alternating current to a direct current.

12. The emergency lighting system of claim 1, wherein the emergency lighting system is a stand-alone system that is placed anywhere proximate a power source.

13. A method of providing emergency lighting using an emergency lighting system comprising:
    determining the emergency lighting system is not receiving electrical power from a power source;
    determining an emergency condition at least in part in response to the determination that the emergency lighting system is not receiving electrical power from the power source;
    providing a control board electrical power at a first voltage from a battery in response to the determination of the emergency condition;
    reducing the electrical power received from the battery to a second voltage; and
    providing the electrical power reduced to the second voltage to one or more emergency lights to activate the one or more emergency lights.

14. The method of claim 13, wherein determining the emergency condition is based on the determination that the emergency lighting system is not receiving electrical power from the power source and a determination that an amount of ambient light proximate the emergency lighting system is below a predetermined threshold.

15. The method of claim 13, wherein providing the electrical power reduced to the second voltage to one or more emergency lights to activate the one or more emergency lights further comprises providing electrical power to the emergency lights at a voltage equal to or less than the second voltage throughout the entirety of the emergency condition.

16. The method of claim 15, wherein determining the emergency condition comprises determining the emergency condition using one or more bipolar junction transistors.

17. The method of claim 13, wherein the first voltage is approximately nine (9) volts and the second voltage is approximately five (5) volts.

18. The method of claim 13, wherein the battery is a Lithium Iron Phosphate battery.

19. The method of claim 18, wherein the emergency lighting system comprises a plurality of printed control boards positioned at least partially within a housing.

20. The method of claim 13, wherein the power source is a wall outlet.

* * * * *